United States Patent [19]
Fraser

[11] 3,889,917
[45] June 17, 1975

[54] JIG FOR PRECAST BRICK-WALL PANELS

[76] Inventor: Donald J. Fraser, 32 Robert Ct., Para Hills, Australia, 5096

[22] Filed: Jan. 18, 1973

[21] Appl. No.: 324,848

[30] Foreign Application Priority Data
Jan. 24, 1972  Australia.............................. 7763/72

[52] U.S. Cl..................................... 249/64; 249/84
[51] Int. Cl................................................ B28b 7/22
[58] Field of Search........................ 249/60, 84–85, 249/91, 119, 129–132, 145, 186, 189, 16, 249/155, 157, 160, 163, 63–64, 98–99, 180, 249/15–16; 425/443, 110, DIG. 5, DIG. 29, 425/441, 436, DIG. 129; 264/261

[56] References Cited
UNITED STATES PATENTS

| | | | |
|---|---|---|---|
| 847,120 | 3/1907 | Sederwall............................ | 249/129 |
| 1,402,084 | 1/1922 | Musser................................ | 249/132 |
| 2,204,151 | 6/1940 | Rodefer et al............. | 425/DIG. 129 |
| 2,550,977 | 5/1951 | Dimock............................... | 249/98 |

FOREIGN PATENTS OR APPLICATIONS

| | | | |
|---|---|---|---|
| 1,955,361 | 5/1971 | Germany............................ | 249/84 |

*Primary Examiner*—Robert D. Baldwin
*Assistant Examiner*—John McQuade
*Attorney, Agent, or Firm*—Wm. T. Wofford

[57] ABSTRACT

A jig for precasting of brick wall panels of the type including a frame on which bricks can be supported in spaced adjacent relationship for the insertion of bonding material therebetween, and wherein means are provided to mould the form of facing joints, the jig being characterised in that it includes a support frame on which bricks can be supported in a face down and common planar relationship, and a series of joint aligning and moulding members, which members are adapted, by engagement from the face into the joints, to align and mould the joints and then be withdrawn from the joints to leave the bonded bricks on the support frame for curing of the bonded material.

4 Claims, 5 Drawing Figures

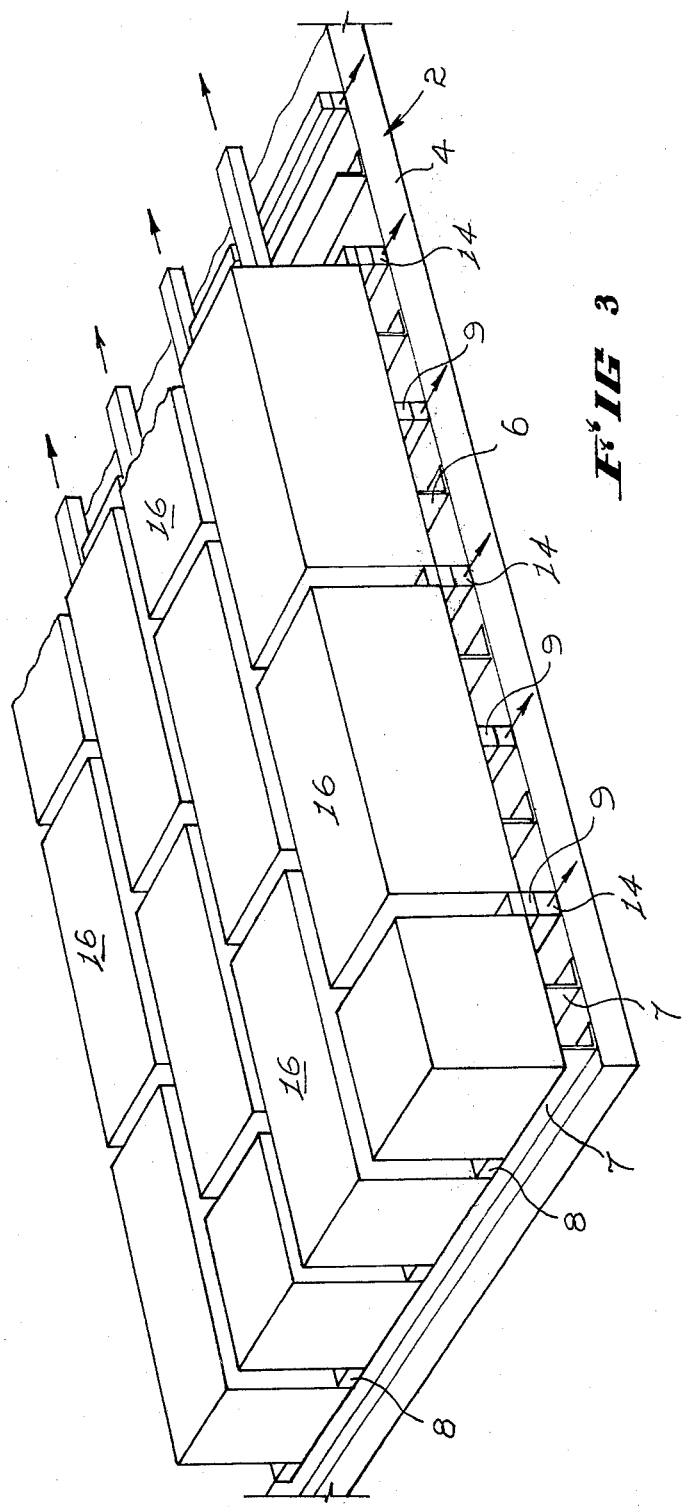

JIG FOR PRECAST BRICK-WALL PANELS

This invention relates to a jig for precasting brick wall panels.

BACKGROUND OF INVENTION

Various attempts have been made to propose a jig onto which bricks can be located so that a bonding material such as a cement mortar can be filled between the adjoining faces so that there is very little skill required in so adequately filling the joints and keeping these aligned and in accurate alignment with other joints.

In one method it has been proposed that the bricks be located on a flexible porous sheet of material through which sheet a vacuum can be drawn. The deformation of the resilient material assits in forming a recess moulded appearance along each joint and such a technique has been considered one of the better systems available.

This system as with others that have been attempted each suffer from high capital cost for the number of jigs required, rapid deterioration of the parts making up the jig under constant use, this being particularly the case with a resilient foam surface, cement mortar build up on faces which thereby reduce the effectiveness and efficiency of the jig for future operations and which are difficult to clean, and difficulties in that any mortar bonding material can be subject to contraction.

OBJECTS OF THIS INVENTION

It is an object of this invention to propose a jig which can be very simply and cheaply manufactured and which still at least to some extent, can while still incorporating the invention and which overcome the problems as indicated.

It is also an object at least in a preferred embodiment to provide that the facing of each joint can, if required, be ironed.

It a further object of this invention at least insofar as possibly an embodiment is concerned that the jig is not so subject to failure by reason of bonding material spill.

Other objects and advantages of the invention will be seen from the further description in this specification.

STATEMENT OF INVENTION

The jig according to the invention while in general terms having means to support the bricks in face down adjoining relationship is characterized in that the main support for the bricks is a separate structure from the aligning and joint face moulding means.

The result of this separation of functions means that the alignment and moulding means can be used in the initial locating and filling of the joints for a particular example but thereafter the alignment and moulding means can be removed leaving the bricks stably supported but no longer restrained strictly in position against alignment means so that contraction can then occur by reason of curing mortar.

Furthermore there is the advantage that the supporting means, having only the function that they should be able to support a curing structure in a stable manner, can be made in a very simple and therefore very inexpensive way, the alignment and moulding members being able to be used reasonably soon after each joint filling so that a lesser number for an operation of manufacture will be necessary.

Perhaps in one form therefore the invention could be said to reside in a jig for precasting of brick wall panel of a type including a frame on which bricks can be supported in spaced adjacent relationship for the insertion of a bonding material therebetween and means are provided to mould the facing of the joints, the jig being characterized in that it includes a support frame on which bricks can be supported in a face down and common planar relationship, and a series of joint aligning and moulding members, which members are adapted by engagement from the face into the joints to align and mould the facing of the joints and then be withdrawn from the joints to leave the bonded bricks on the support frame for curing of the bonding material.

It is desirable that the joint aligning and moulding members comprise two sets of members, each member of one set adapted to interlock with the members of the other set so that the sets together can form a crossed pattern with the moulding faces on each of the members of both sets having a common planar relationship.

It will be seen from this desirable arrangment that alignment of the members of one of the sets into, for instance, parallel arrangement can ensure that the joints are aligned as desired and furthermore provided the interlocking is only a loose fitting interlocking the whole of the brick collection can be either spaced or contracted to allow for variations in sizes of bricks while still allowing selection of outer dimensions, but if it is more desirably, each of the joints can be kept at a reasonably common thickness.

In a further desirable arrangement each member of one set of the joint aligning and moulding members include a bar portion of constant cross section over their mould face length and each member of the other set includes a section of lesser thickness.

In a further desirable feature the jig has the support frame comprising a base frame supporting a series of parallel members each having a common planar upper supporting face.

In a preferred embodiment such upper supporting faces are thin edges and in this way any wasted bonding material falling onto the support frame will not readily impinge upon the upper supporting surface so that this is one way of ensuring lack of volnerableness to build up of bonding material whereby reducing the efficiency and effectiveness of the jig.

The precasting of a brick wall panel using the disclosed apparatus includes the steps of locating a series of bricks in spaced adjacent relationship, face downward, onto a supporting frame, aligning and moulding members effecting alignment of the bricks, inserting bonding material between the bricks, the location of the moulding face supporting and effecting a moulding of a bonding facing of the joints along the underneath or facing side between the bricks, and withdrawing the aligning and moulding members whereby to leave the bonded bricks supported on the support frame for curing of the bonding material.

Other features particularly in a preferred arrangement will be better understood by description where this refers to drawings and for this purpose reference will now be made to a preferred embodiment with reference to and as illustrated by accompanying drawings in which:

FIG. 1 is a perspective view of a portion of a mould according to the preferred embodiment this showing the jig ready for placing thereon of bricks, FIg. 2 is a cross section along the lines 2—2 as shown in FIG. 1, FIG. 3 shows the jig as in FIG. 1 again in the same perspective view in this case however bricks having been located in position on the jig, FIG. 4 is a cross sectional elevation of a portion as it could appear through FIG. 3 after the mortar is included and at least one of the joining and moulding members has been partly withdrawn, and FIG. 5 is a view in perspective again as in FIGS. 1 and 3 but in this case with the joining and moulding members fully removed showing a portion of precast wall panel simply resting on the support member in which position the bonding material would be normally allowed to cure.

Now referring to the drawings in particular theree is shown a jig 1 which includes as two functionally separate parts, a support frame 2 and aligning and moulding members 3.

The support frame 2 comprises a base frame 4 which is constituted by a solid timber board and secured to an upper face of this frame 4 are a series of parallel supporting members 6.

In this preferred embodiment each of the supporting members comprises a mild steel member of constant right angular cross section secured one face flat upon the upper face of the base frame 4.

The spacing between respective supporting members 6 is selected so that bricks subsequently located to rest upon these will be stably supported in the pattern subsequently required for forming of a wall panel.

It will be seen for instance that a first two supporting members 7 are separated by a much shorter separation distance than subsequent distances and this of course is to allow for stable support of half bricks.

The aligning and moulding members 3 include two separate sets a first of these being constituted by a series of bars 8 each of constant rectangular cross section and adapted to lie across the upper edges of the supporting members 6, in parallel alignment as is shown of course in FIG. 1 and subsequent figures.

The aligning and moulding members 3 further include a second set of members 9 which are adapted to lie between respective supporting members 6 and while in parallel alignment interlock with aligning and moulding members 8 so as to form a cross pattern with moulding faces on each of the members 8 and 9, the faces shown in typical instances as 11, 12, having a common planar relationship or perhaps in other words generally being aligned within a common plane.

It is to be noted that the art to which this invention refers is an essentially practical art and whereas close tolerance can be desirable some variation in tolerances can be quite acceptable without departing in any way from any spirit of this invention.

The aligning and moulding members 9 in each case include discrete sections 13 which are of lesser height than the portions supporting the moulding faces 12 and such sections of lesser height should be at least so low that when in the aligning and moulding position they will not necessarily scrape on removal, against any bricks supported on the supporting members 6 and the purpose of these lesser height sections is that very obviously from the application simply provide a joining link between the portions providing the raised sections.

The selection of the length of each of the raised sections supporting the moulding faces 12 is governed by the size bricks which are intended to be cast and this therefore must vary in accordance with the dimensions of the selected bricks.

The length of each portion of greater height providing the moulding surface 12 however should be of a length just slightly less than the dimension of the brick for which it is selected. The purpose of this slightly lesser length is to allow a freedom of longitudinal movement after the bricks and mortar have been placed in position which in effect allows the joint to be "ironed" or in other words smoothed by rubbing action prior to removal of the mould.

As an illustration of the degree of tolerance found useful here, in the preferred embodiment, with a brick with a minor face dimension of three inches, a length of moulding face 12 would be two and thirteen sixteenths of an inch so leaving a clearance of three sixteenths of an inch equally divided between both ends.

This degree of tolerance is illustrative only, of course but indicates the degree to which the tolerance is found to be satisfactory without excessive mortar or bonding material passing between the slot formed by this clearance and yet still allowing freedom of longitudinal oscillatory motion to effect the ironing section.

With the jib 1 set up as in FIG. 1 each of the aligning and moulding members 9 are supported in a moulding position by reason of, in each case, a support bar 14. This support bar 14 is separately slidable from beneath each member 9 so that upon longitudinal slidable withdrawal of member 14 each of the members 9 will drop from a position as shown in FIG. 1 and the dimensions of the member 14 are selected so that the drop is then sufficient for the upper-most portion of each member 9 to pass beneath the common plane as is established by the upper surfaces of the supporting member 6 and of course thereby the underneath surfaces of the moulding and aligning members 8.

In this way each of the members 9 can be withdrawn perpendicularly with respect to the common planar relationship of the moulding faces thereby effecting a simple removal without deterioration of the moulded surfaces.

Figure 1:
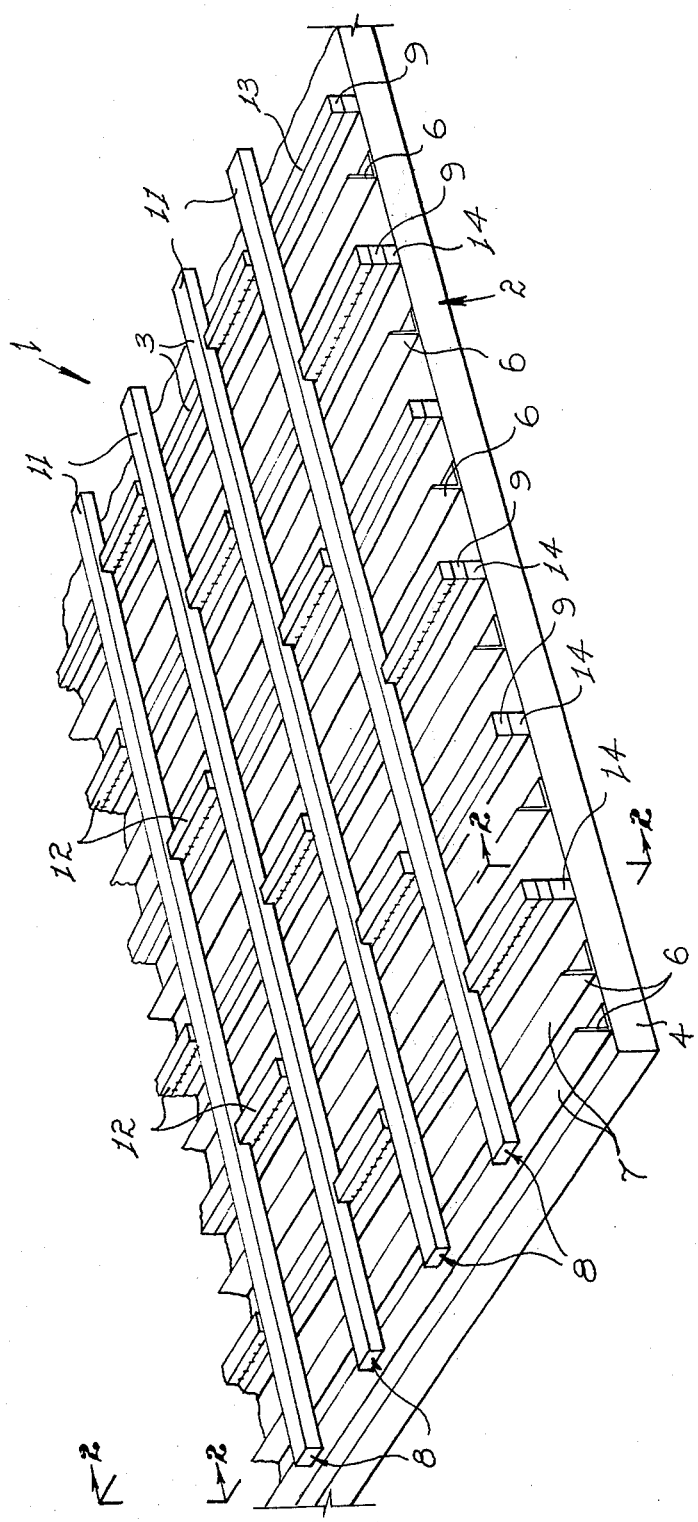
FIG. 1 is not necessarily dimensionally accurrate being illustrative of the arrangement and showing only a part of what might be a jig for the support of a large panel. The selection of the size of panel is again a matter of free selection and the embodiment illustrates only a part of a jig which is constructed on the basis that this can be for a much larger panel.
Figure 2:
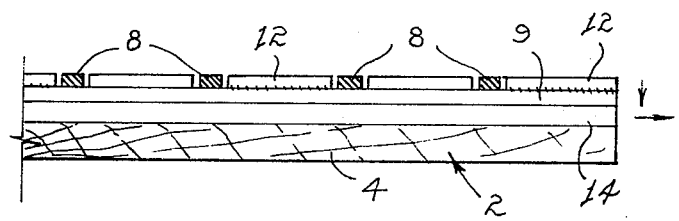
FIG. 2 is a cross sectional elevation along the lines 2 — 2 of FIG. 1 which of course are not necessarily dimensionally or proportionally accurrate but are illustrative of the principals as carried out in accord with the preferred embodiment.

With the jig 1 set up the manner as shown in FIG. 1 the next step is to take bricks and support these in space adjacent relationship each in a face down position and, by reason of their faces commonly resting upon the edges of the supporting members 6, such faces will be in a common planar relationship.

The distance apart of each brick from its adjacent brick is established by reason of the thickness of each of the aligning and moulding members and when all the bricks for a panel of desired size have been so located, collectively the bricks and the aligning and moulding members should be urged together and generally worked so that all the joints are in alignment which can of course be established by reason of the alignment members, and secondly the bricks should be compacted together insofar as this is possible against the intervening aligning and moulding members.

In this way uneven bricks, variations in dimensions of bricks and other small inaccurratcies can generally be averaged out so that, overall, these will not be dominant and alter the general alignment and subsequent good finish of a panel made according to this technique.

Once such work has been done it is then necessary to insert bonding material between the joints and this preferably would be achieved by inserting the bonding material from above the bricks and compacting this into the joints.

Preferably such bonding material is a cheap grouting material such as Portland cement mixed with appropriate materials such as hydrated lime and sand but other materials will obviously be suitable as desired.

Once the bonding material has been inserted between the joints and provided the bonding material is at the suitable stage of curing, which can be almost immediately after placing of the bonding material in position in some cases, the aligning and moulding members can then be withdrawn.

It is desirable in relation to the preferred embodiment that before the members 9 be withdrawn that they be worked backward and forwards so as to effect an ironing of the face of the bonding joint so as to leave this in a smooth condition which is considered by many to be of more pleasing appearance.

Figure 4:
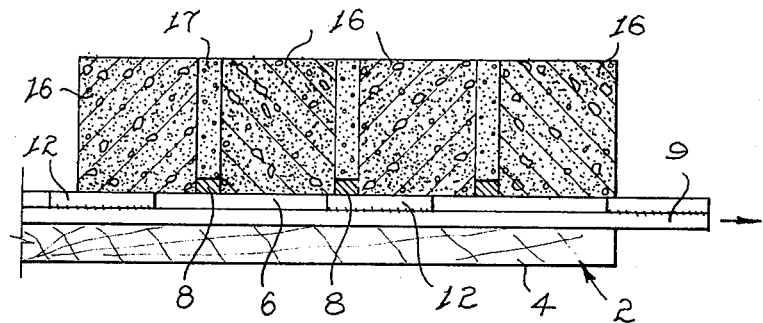
Figure 5:
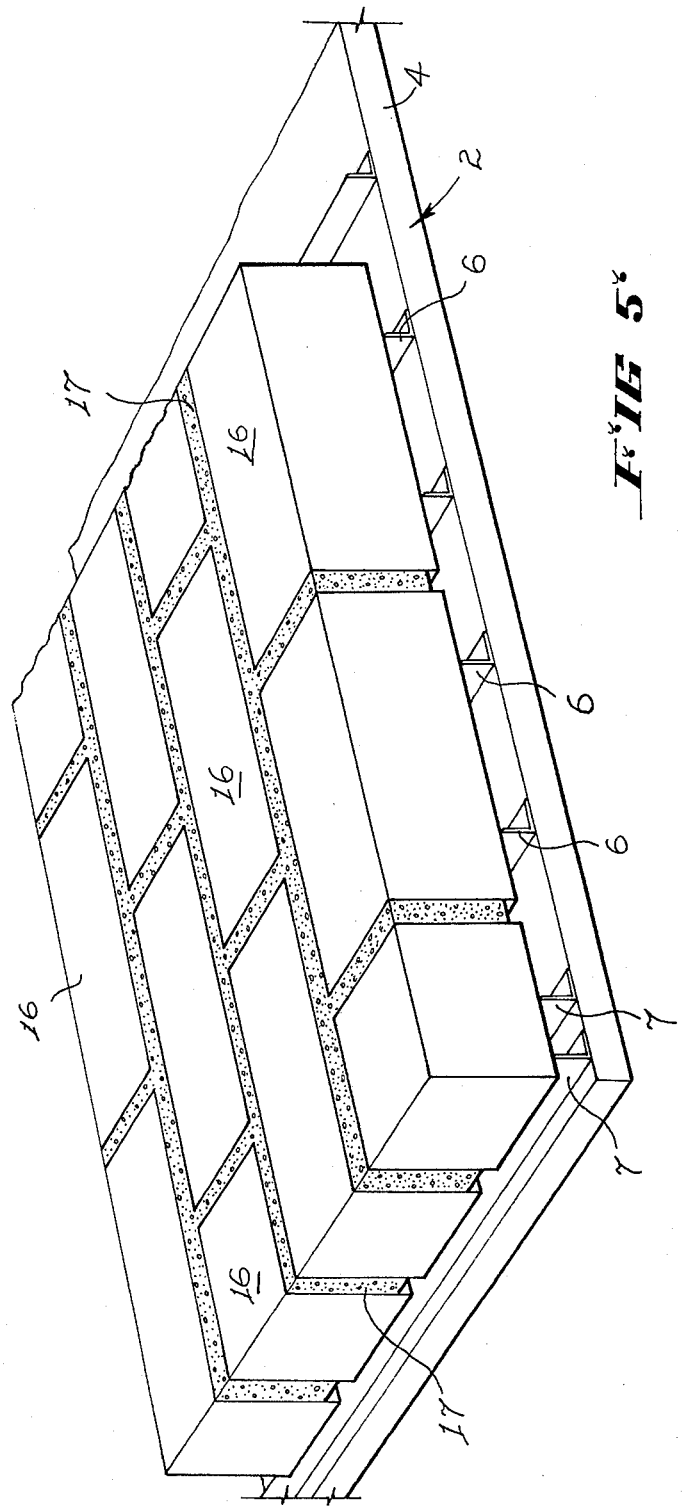

The steps, thereafter, are therefore to effect a perpendicular drop of the members 9 by removing the bars 14 and then withdraw members 9 by longitudinally withdrawing them from below the brick faces. The bricks shown as 16 in FIG. 3 are then left after withdrawl of members 9 as shown in FIG. 4, as shown in FIG. 5. In this FIG. 5 the bricks 16 which are shown as an illustrative part panel in bonded form are freely resting on the supporting frame and would normally be left in this condition until the bonding material 17 is sufficiently cured.

There is very often some contraction of the bonding material 17 particularly when the material such as Portland cement are used and apart from some frictional resistance which can be regarded as reasonably small the panel as thus formed is free to shift in accordance with such contraction of the bonding material.

This would also involve the removal, by longitudinal movement, of the aligning and moulding members 8 and it will be seen that simply the longitudinal removal will in this case effect the ironing felt desirable in many cases.

The precast panel once the aligning moulding members are removed rests freely upon the base frame 2 and as is shown in FIG. 5 would be, apart from some friction, free to move across this so as to allow for some contraction of the bonding material 17.

Most importantly the cost of manufacture of the supporting base frame 2 may be very small so that a large number of these can be produced at small capital cost and therefore it becomes economic to leave each of the panels as precast on such a supporting base frame 2 for delivery purposes to site. This would have the result of reducing damage of a precast panel and reducing chances of accidental breakage due to handling of an unsupported brick panel.

Many advantages will be seen from this preferred embodiment of the jig as described particularly including the questions of cost, the ability to remove aligning and moulding members so reducing capital cost of jig material, and the ability to support a brick panel in such a way that bonding material which may accidentally fall therebetween will not unduly be caused to lie against the face of the bricks and therefore spoil these. Furthermore the separation of the apparatus for the alignment and moulding from the mere support aspect allows the final panel to be left on a very low cost unit and futhermore in a condition that it can allow for contraction of the bonding material without breaking of bonding between the adjacent surfaces.

Having now described the preferred embodiment it would be clear that what has been described has been described in connection with a recess joint. This quite clearly is not an essential finish but is typical and various other moulded joint finishes can be used including an arcuate finish with both edges aligning with the perimeter edges of the bricks and so on.

Likewise the actual method of inserting bonding material and the way in which this is applied and distributed can be varied, for instance it can be extended to effect a plaster finish over the back of the brick panel, that is, the upper surface as shown in the embodiment, and likewise additional elements such as joining plates and other members could be likewise moulded into the panel for assistance in joining of adjacent panels subsequently.

Also, illustrated by the preferred embodiment, is a cross lap alignment of bricks. Any lap system can be used or indeed the bricks need not be lapped but have adjacent vertical joints aligned if desired.

I claim:

1. A jig for precasting of brick wall panels said jig including a frame on which bricks can be supported on their faces in spaced adjacent relationship for the insertion of bonding material therebetween, and wherein means are provided to mould facing joints between said bricks, the jig being characterized in that said support frame comprises a base frame supporting a series of parallel members each having a supporting edge lying in a common plane, and a series of brick aligning and joint moulding members, which members are adapted, by engagement into the spaces between adjacent bricks, to align said bricks and mould the joints and then be withdrawn from the joints to leave the bonded bricks on the support frame for curing of the bonded material; and wherein the jig is further characterized in that the brick aligning and joint moulding members comprise first and second sets of members, each of the first set adapted to interlock with the members of the second set so that the sets together can form a crossed pattern with moulding faces on each of the members of both sets having a common planar relationship which lies above said common plane; and wherein the jig is further characterized in that each member of the first set of the joint aligning and moulding members includes a bar portion of constant cross section over its mould face length, and members of the second set each includes sections of lesser height whereby to allow the crossing of the members of said first set past the members of said second set, and each member of said second set is supported by a bar of constant cross section which is removably mounted for sliding from beneath the respective member, whereby the said each member of said second set can fall perpendicularly away from the joint it has moulded to a height less than that of said common plane and thereby permit the withdrawal in a horizontal direction of a formed panel.

2. A jig for precasting of brick wall panels as in claim 1 in which the jig is further characterized in that the members of the said second set, when in the said crossing relationship, are arranged so that a small longitudinal movement is possible relative to the members of the first said set whereby to effect an ironing action of the bonding material.

3. A jig for precasting of brick wall panels which have joints extending longitudinally of the bricks and joints extending transversely of the bricks, said jig comprising:
   a. a frame adapted to be horizontally disposed; said frame having a support surface means disposed in a first common plane and a plurality of spaced parallel support surfaces disposed in a second common plane which is spaced from and above said first common plane;
   b. a series of longitudinal brick aligning and joint moulding members, each of which is an elongated bar of length at least equal to the length of said jig; said members being supported by said plurality of spaced parallel support surfaces and disposed in spaced parallel relation so as to align the bricks of the wall panel to be precast, which bricks are to be supported in face down common planar relationship on said plurality of spaced parallel support surfaces;
   c. a series of transverse brick aligning and joint moulding members, each having a plurality of transverse joint moulding surfaces and each of which is an elongated bar of length at least equal to the width of said jig; said transverse brick aligning and joint moulding members being supported by a series of transversely extending support members and disposed in spaced parallel relation so as to align the bricks of the wall panel to be precast; said transverse brick aligning and joint moulding members each having intermediate upper surfaces of reduced height between the transverse joint moulding surfaces, such that said intermediate upper surfaces are not above said second common plane;
   d. the transversely extending support members each being an elongated bar having planar lower surface portions supported by said first support surface means and upper planar surface portions supporting a said transverse brick aligning and joint moulding member; such that withdrawal of said transversely extending support members permits said transverse brick aligning and joint moulding members to move downwardly beneath and free of the transverse joints of the bricks of the wall panel.

4. A jig for precasting of brick wall panels which have joints extending longitudinally of the bricks and joints extending transversely of the bricks, said jig comprising:
   a. a frame adapted to be horizontally disposed; said frame having a support surface means disposed in a first common plane and a plurality of spaced parallel support surfaces disposed in a second common plane which is spaced from and above said first common plane;
   b. a series of longitudinal brick aligning and joint moulding members, each of which is an elongated bar of length at least equal to the length of said jig; said members being supported by said plurality of spaced parallel support surfaces and disposed in spaced parallel relation so as to align the bricks of the wall panel to be precast, which bricks are to be supported in face down common planar relationship on said plurality of spaced parallel support surfaces;
   c. a series of transverse brick aligning and joint moulding members, each having a plurality of transverse joint moulding surfaces and each of which is an elongated bar of length at least equal to the width of said jig; said transverse brick aligning and joint moulding members being supported by a series of transversely extending support members and disposed in spaced parallel relation so as to align the bricks of the wall panel to be precast; said transverse brick aligning and joint moulding members each having intermediate upper surfaces of reduced height between the transverse joint moulding surfaces, such that said intermediate upper surfaces are not above said second common plane;
   d. the transversely extending support members each having lower surface portions supported by said first support surface means and upper surface portions supporting a said tranverse brick aligning and joint moulding member; such that withdrawal of said transversely extending support members permits said transverse brick aligning and joint moulding members to move downwardly beneath and free of the transverse joints of the bricks of the wall panel.

* * * * *